(12) United States Patent
Furuhashi et al.

(10) Patent No.: US 7,424,174 B2
(45) Date of Patent: Sep. 9, 2008

(54) IMAGE PROCESSING DEVICE

(75) Inventors: Yukihito Furuhashi, Hachioji (JP); Yuichiro Akatsuka, Tama (JP); Takao Shibasaki, Tokyo (JP)

(73) Assignee: Olympus Corporation, Tokyo (JP)

( * ) Notice: Subject to any disclaimer, the term of this patent is extended or adjusted under 35 U.S.C. 154(b) by 301 days.

(21) Appl. No.: 11/337,956

(22) Filed: Jan. 23, 2006

(65) Prior Publication Data

US 2006/0120606 A1    Jun. 8, 2006

Related U.S. Application Data

(63) Continuation of application No. PCT/JP2004/010589, filed on Jul. 20, 2004.

(30) Foreign Application Priority Data

Jul. 24, 2003   (JP) ............................. 2003-278992

(51) Int. Cl.
  *G06K 9/36*  (2006.01)
  *G06K 9/46*  (2006.01)
  *G06K 9/66*  (2006.01)
(52) U.S. Cl. .................... 382/291; 382/286; 382/190
(58) Field of Classification Search ............... 382/100, 382/106, 154, 151, 286, 267, 291, 312, 190; 348/42, 46–48, 94, 95, 135
See application file for complete search history.

(56) References Cited

U.S. PATENT DOCUMENTS 4,858,157 A * 8/1989 Murai et al. ................ 382/154
5,793,900 A * 8/1998 Nourbakhsh et al. ........ 382/263
5,923,773 A * 7/1999 Oshima ...................... 382/154
6,577,249 B1   6/2003 Akatsuka et al.
2001/0014171 A1* 8/2001 Iijima et al. ................. 382/154
2002/0191862 A1  12/2002 Neumann et al.

FOREIGN PATENT DOCUMENTS

JP     8-43055    2/1996
JP    10-21401    1/1998

OTHER PUBLICATIONS

Kato H. et al., "An Augmented Reality System and its Calibration Based on Marker Tracking", Journal of The Virtual Reality Society of Japan (TVRSJ), 4(4):607-616 (1999).
Jiang B. et al., "Extendible Tracking by Line Auto-Calibration", ISMAR, pp. 97-103 (IEEE) (2001).

* cited by examiner

*Primary Examiner*—Yon Couso
(74) *Attorney, Agent, or Firm*—Scully, Scott, Murphy & Presser, P.C.

(57) ABSTRACT

An image processing device comprises an image acquisition apparatus configured to acquire an image of an object, a feature extraction unit configured to extract a feature portion from a visual field of the image acquired by the image acquisition apparatus, a weighting section configured to calculate a weight in accordance with extraction conditions of the feature portion extracted by the feature extraction unit to weight the feature portion, and a position orientation obtaining section configured to obtain a position and an orientation of the image acquisition apparatus on a reference coordinate system from the feature portion weighted by the weighting section.

34 Claims, 5 Drawing Sheets

| Position | Weight |
|----------|--------|
| A | 1.0 |
| B | 0.8 |
| C | 0.4 |
| D | 0.1 |

| Type | Reference weight |
|---|---|
| Marker | 1.0 |
| NFAC point | 0.4 |
| Natural feature segment subjected to AC | 0.8 |

IMAGE PROCESSING DEVICE

CROSS-REFERENCE TO RELATED APPLICATIONS

This is a Continuation Application of PCT Application No. PCT/JP2004/010589, filed Jul. 20, 2004, which was published under PCT Article 21(2) in Japanese.

This application is based upon and claims the benefit of priority from prior Japanese Patent Application No. 2003-278992, filed Jul. 24, 2003, the entire contents of which are incorporated herein by reference.

BACKGROUND OF THE INVENTION

1. Field of the Invention

The present invention relates to an image processing device for processing an image obtained by image-acquiring an object.

2. Description of the Related Art

Generally, there is distortion in an image optically obtained by an image acquisition apparatus such as a camera. As a method of removing this distortion, therefore, various technologies have conventionally been proposed. However, even when such a technology is applied, a screen periphery includes more errors.

An image is discrete information, and even one-pixel shifting of a point located at a remote place on the image enlarges a real-space error.

Accordingly, position and size in the image are very important for calculating position and orientation of the camera.

Conventionally, many methods of obtaining position and orientation information of the camera have been proposed.

For example, U.S. Pat. No. 6,577,249 B1 discloses position and orientation calculation which uses a marker. This is a technology for enabling checking of positions of a reference marker and markers arranged on its periphery, and/or feature portions by reading information contained in the reference marker to schematically obtain a position and an orientation of a camera. According to the technology disclosed in this USP, by checking positions of four or more markers and/or feature portions, it is possible to estimate a position and an orientation of the camera by using this information. Additionally, this USP discloses that in a related information presentation device for superimposing and displaying pieces of related information of portions of an object in a corresponding position on an acquired image, when the pieces of related information are superimposed and displayed, a superimposed displaying position of the pieces of related information to be presented is decided based on the position and the orientation of the camera thus estimated, i.e., in accordance with a visual field of the camera.

"An Augmented Reality System and its Calibration based on Marker Tracking", pp. 607-616, Journal of The Virtual Reality Society of Japan (TVRSJ), discloses position and orientation calculation which uses a marker alone.

Figure 1A:
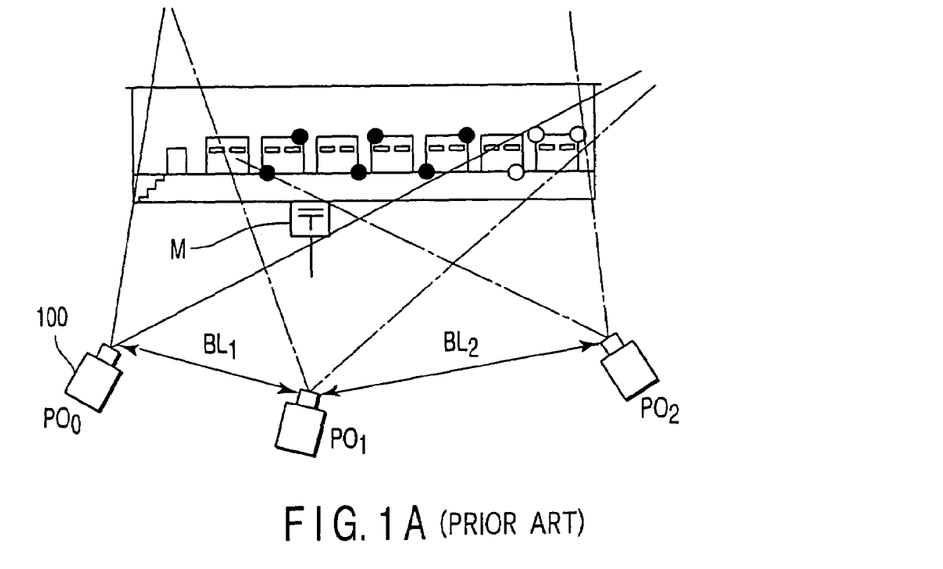
FIG. 1A is a schematic diagram illustrating camera position and orientation calculation by NF disclosed in US 2002/019862 A1.

US 2002/0191862 A1 discloses camera position and orientation calculation based on natural features (NF). A known shape M of a position and an orientation is used as shown in FIG. 1A, a position and an orientation of the camera are calculated by a procedure shown in FIG. 1B, and further a three-dimensional position of each feature point is calculated.

Figure 1B:
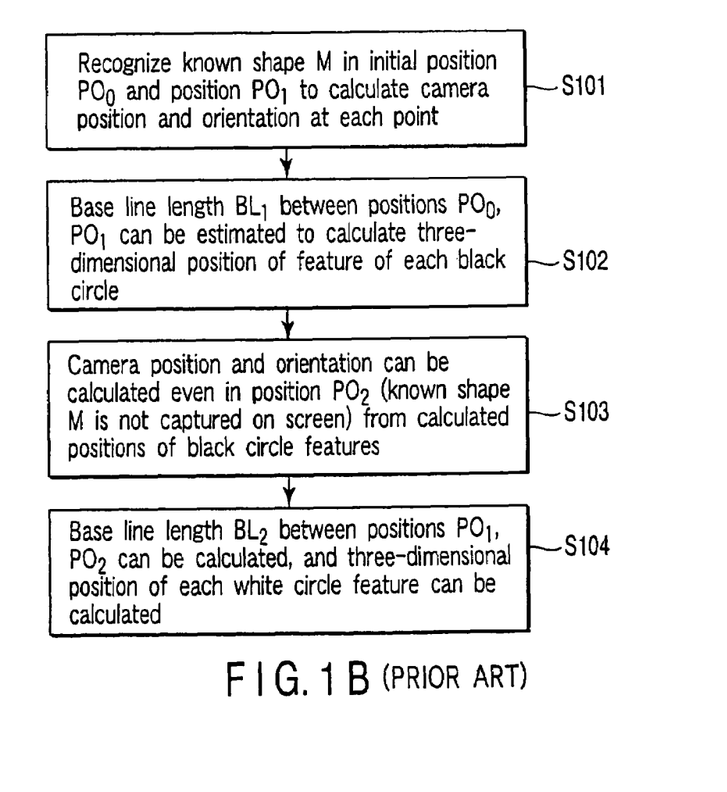
FIG. 1B is a flowchart of the camera position and orientation calculation method by NF.

First, the following processing is executed in step S101. That is, by recognizing the known shape M in an initial position PO0, a position and an orientation of a camera 100 are calculated. Subsequently, the camera 100 is continuously moved while the known shape M is captured on a screen (visual field) from the initial position PO0. When the camera is moved to a position PO1, similarly by recognizing the known shape M, a position and an orientation of the camera 100 in the position PO1 are calculated.

Next, the following processing is executed in step S102. That is, based on the calculated positions and orientations of the camera 100 in the positions PO0 and PO0, a base line length BL1 between the positions PO0 and PO1 can be estimated. Accordingly, by a triangular surveying principle, a three-dimensional position of each feature point indicated by a black circle in FIG. 1A and continuously captured on the screen is calculated.

Subsequently, the following processing is executed in step S103. That is, the camera 100 is continuously moved from the position PO1. When it is moved to a position PO2, the known shape M cannot be captured any more on the screen. However, even in the position P2 in which the known shape M is not captured on the screen, a position and an orientation of the camera 100 can be calculated from the calculated position of each black circle feature point.

Accordingly, the following processing is executed in step S104. That is, a base line length BL2 between the positions PO1 and PO2 can be calculated. A three-dimensional position of even a feature point not captured on the screen in the position PO0 indicated by a white circle in FIG. 1A can be calculated.

US 2002/0191862 A1 discloses an auto-calibration (AC) method as a conventional technology.

ISMAR 2001 pp. 97-103 "Extendible Tracking By Line Auto-calibration" discloses camera position and orientation calculation based on tracking of a natural feature segment and AC.

BRIEF SUMMARY OF THE INVENTION

According to a first aspect of the present invention, there is provided an image processing device comprising:

an image acquisition apparatus configured to acquire an image of an object;

a feature extraction unit configured to extract a feature portion from a visual field of the image acquired by the image acquisition apparatus;

a weighting section configured to calculate a weight in accordance with extraction conditions of the feature portion extracted by the feature extraction unit to weight the feature portion; and a position orientation obtaining section configured to obtain a position and an orientation of the image acquisition apparatus on a reference coordinate system from the feature portion weighted by the weighting section.

According to a second aspect of the present invention, there is provided an image processing device comprising:

image acquisition means for acquiring an image of an object;

feature extraction means for extracting a feature portion from a visual field of the image acquired by the image acquisition means;

weighting means for calculating a weight in accordance with extraction conditions of the feature portion extracted by the feature extraction means to weight the feature portion; and position orientation obtaining means for obtaining a position and an orientation of the image acquisition means on a reference coordinate system from the feature portion weighted by the weighting means.

Advantages of the invention will be set forth in the description which follows, and in part will be obvious from the description, or may be learned by practice of the invention.

Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 2:
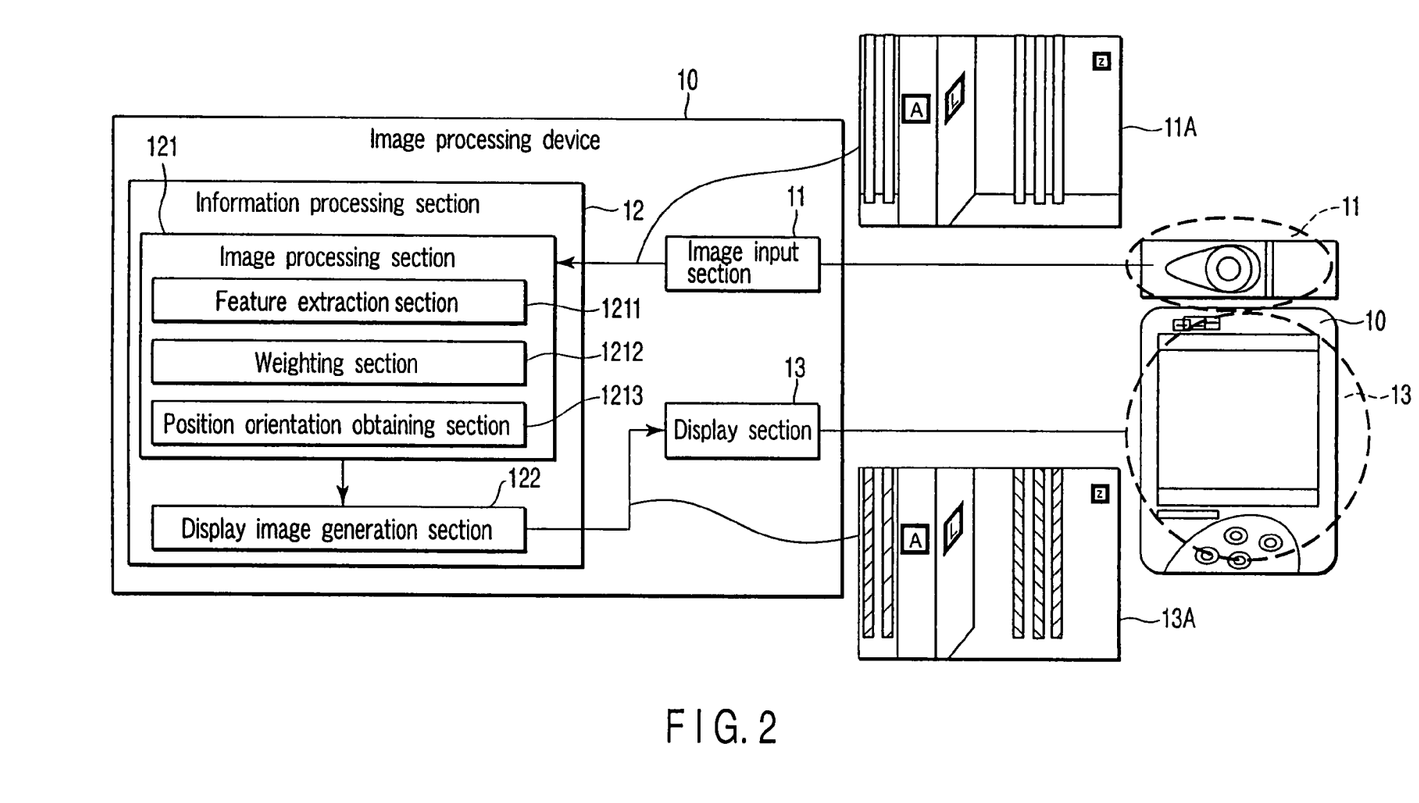
FIG. 2 is a diagram showing a configuration of an image processing device according to an embodiment of the present invention.

As shown in FIG. 2, an image processing device 10 according to an embodiment of the present invention is provided in a form of a PDA equipped with a camera. This image processing device 10 comprises an image input section 11 which is an image acquisition apparatus, an information processing section 12 for processing an image input by the image input section 11, and a display section 13 for displaying information obtained as a processing result at the information processing section 12. The information processing section 12 includes an image processing section 121 and a display image generation section 122. The image processing section 121 has a feature extraction section 1211, a weighting section 1212, and a position orientation obtaining section 1213.

Figure 3:
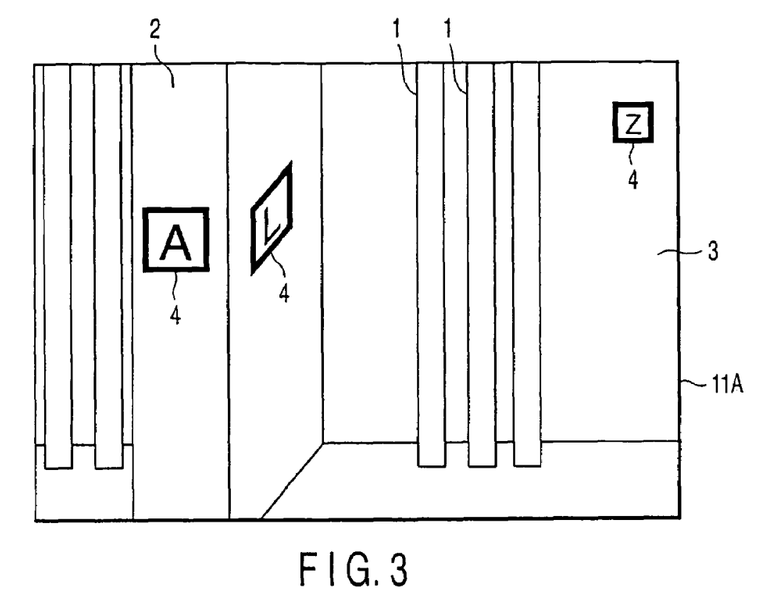
FIG. 3 is a diagram showing an example of an input image.

In the image processing device 10, for example, an input image 11A shown in FIG. 3 is obtained by the image input section 11, and input to the image processing section 121 of the information processing section 12. The example of the input image 11A shown in FIG. 3 is in the case of image acquiring in a factory equipped with a pipe 1, a pillar 2, and a wall 3, and markers 4 are arranged in the pillar 2 and the wall 3. In the marker 4, a pattern encoding position and orientation information of the marker similar to that disclosed in U.S. Pat. No. 6,577,249 B1 or the literature TVRSJ is written.

Accordingly, the feature extraction section 1211 of the image processing section 121 extracts an image of each marker based on information (pattern extraction program, parameter or the like) regarding extraction of a prestored marker shape. The position orientation obtaining section 1213 obtains position and orientation information of the each marker from the image of markers extracted by the feature extraction section 1211. Then, based on this, a position and an orientation of the image input section 11, i.e., the image processing device 10, with respect to the marker are detected. In this case, as shown in FIG. 3, the input image 11A contains a plurality of markers 4. Reliability of each marker varies depending on its position in the input image, a size on the input image, or the like. Thus, an image of each marker extracted by the feature extraction section 1211 is weighted by the weighting section 1212. Based on the weighted images of the markers, the position orientation obtaining section 1213 detects a position and an orientation of the image input section 11 on a reference coordinate system.

The image processing section 121 has a function of reading related information such as an image, a 3D model, a moving image, or a voice specified by a pattern of the marker 4, prestored by the image processing device 10, or stored in an external server.

Then, the display image generation section 122 of the information processing section 12 generates a superimposition image of a form compliant with the position and the orientation of the image input section 11, i.e., the position and the orientation of the image processing device 10, detected by the image processing section 121, from the related information read by the image processing section 121. The generated superimposition image is superimposed on a real image (input image 11A) obtained by image acquiring of the image input section 11 to generate a display image 13A shown in FIG. 2, and this image is displayed in the display section 13.

Further, the feature extraction section 1211 extracts natural features (NFs) similar to that disclosed in US 2002/0191862 A1 and natural feature segments similar to that disclosed in the literature ISMAR 2001 as feature portions in addition to the markers. In this case, the weighting section 1212 executes weighting for the feature portions. Then, the position orientation obtaining section 1213 detects the position and the orientation of the image input section 11 based on the weighted markers, and the weighted NFs and the natural feature segments.

Figure 4:
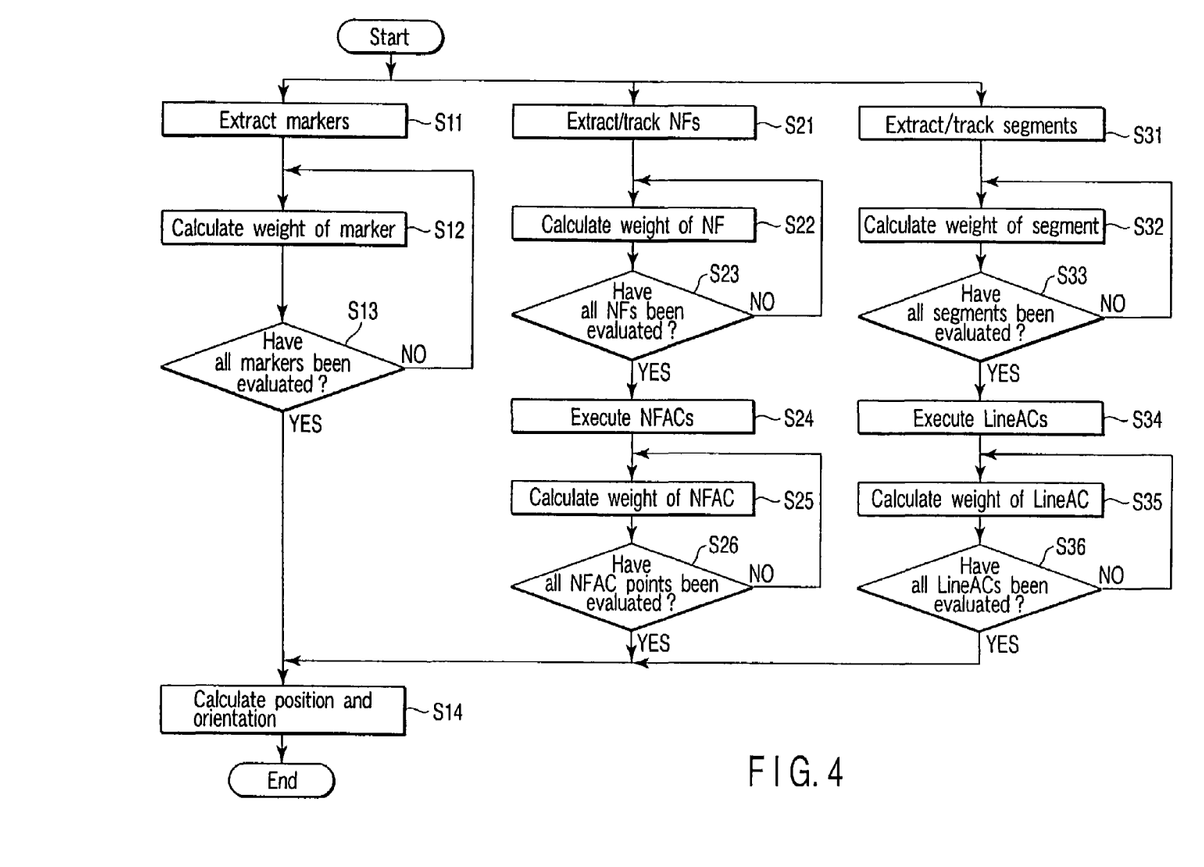
FIG. 4 is a flowchart of an operation of an image processing section of the image processing device according to the embodiment.

Such an operation of the image processing section 121 of the image processing device 10 will be described more in detail by referring to a flowchart of FIG. 4. That is, markers are extracted as feature portions from the input image 11A input from the image input section 11 by the feature extraction section 1211 (step S11). Then, the weighting section 1212 calculates a weight of one of the markers (step S12).

In this case, the weight is calculated based on at least one of a position of the marker in the input image 11A, a size of the marker in the input image 11A, a distortion amount of the marker in the input image 11A, and an angle of the marker to the image acquisition apparatus. This calculation can be carried out to obtain an accurate value by using a function equation. However, values of plural stages may be easily obtained from a table.

Figure 5A:
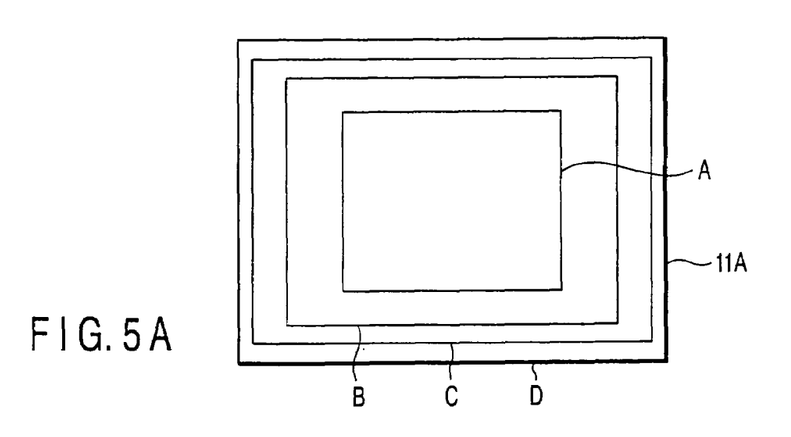
FIG. 5A is a diagram showing area classification on the input image.
Figure 5B:
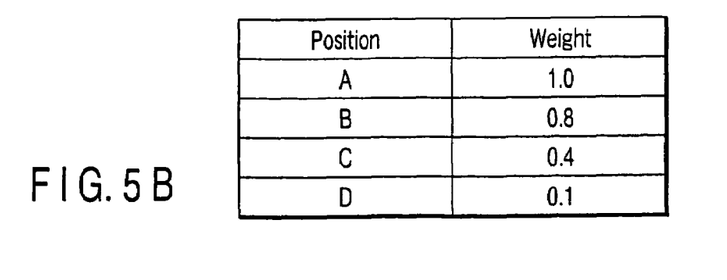
FIG. 5B is a diagram showing an example of a weight table for each classified position.

For example, in the case of weighting based on a position of a marker, as shown in FIG. 5A, positions on the input image 11A are classified into four areas A to D, and weight values are prepared for the classified positions in a table as shown in FIG. 5B. Accordingly, a weight can be easily obtained depending on which classified position the extracted marker is in. In this case, a weight value is higher in a position nearer to a center of the input image 11A because distortion is present in the image nearer to a peripheral portion to include an error. When such weighting is carried out, in the example of FIG. 3, a weight value of a marker having a pattern "A" is "0.8", a weight value of a marker having a pattern "L" is "1.0", and a weight value of a marker having a pattern "Z" is "0.4".

In the case of calculating a weight based on a size of a marker in the input image 11A, a higher weight value is set as a size is larger. In the case of calculating a weight based on a distortion amount of a marker, a higher weight value is set as a distortion amount is smaller.

In the case of calculating a weight based on an angle of a marker with respect to the image acquisition apparatus, a lower weight value is set as it is in the vicinity of a front with respect to the image acquisition apparatus, and a higher weight value is set as an angle is nearer to 90°. An angle of a marker with respect to the image acquisition apparatus may be roughly estimated, or an angle obtained by calculating even a three-dimensional orientation of a marker may be used.

Thus, marker weight calculation is repeated until an end of evaluation for all the markers in the input image 11A (step S13). After all the markers have been evaluated, the position orientation obtaining section 1213 calculates a position and an orientation of the image input section 11, i.e., the image processing device 10, from the weighted feature portions (step S14).

NFs are extracted as a feature portion from the input image 11A input from the image input section 11 and tracked by the feature extraction section 1211 (step S21). Details on the NF extraction and tracking are disclosed in US 2002/0191862 A1. Then, a weight of one of the NFs is calculated by the weighting section 1212 (step S22).

In this case, the weight is calculated based on at least one of a position of the NF, an amount indicating a feature degree of the NF, and the number of tracking continuities in the input image 11A. For example, in the case of calculating a weight based on the position of the NF in the input image 11A, a higher weight value is set as the position is near to a center in the input image 11A. The amount indicating the feature degree of the NF is decided based on at least one of a minimum unique value of a variance covariance matrix around the NF, and intensity of a pixel value. In the case of calculating a weight based on the number of tracking continuities, a higher weight value is set as the number is larger. In image tracking, when the image acquisition apparatus moves, an image of a much deteriorated state may become an input image. Normally, this is an image sufficiently processed before and after by about one frame. In such a case, even when tracking becomes discontinuous on the deteriorated input image, tracking itself can be continued if tracking can be carried out in a next frame. In this case, the number of continuities is reset once. In other words, the large number of continuities means that tracking has been successfully done even in the input image of deteriorated quality, and reliability is high as an NF. In this weight calculation, an accurate value can be obtained by using a function equation. However, values of plural stages may be easily obtained from the table.

Thus, NF weight calculation is repeated until an end of evaluation for all the NFs in the input image 11A (step S23). After all the NFs have been evaluated, the feature extraction section 1211 executes auto-calibrations (NFACs) similar to that disclosed in US 2002/0191862 A1 (step S24). Then, a weight of each of the NFACs is calculated by the weighting section 1212 (step S25).

In this case, the weight is calculated in accordance with a condition during NFAC. The condition during the NFAC is at least one of an angle formed between rays, a shortest distance between rays, a position of an NF to be used, an amount indicating a feature degree of the NF to be used, and the number of tracking continuities for the NF to be used. In this calculation, an accurate value can be obtained by using a function equation. However, values of plural stages may be easily obtained from the table.

In the case of calculating a weight based on the angle formed between the rays, a higher weight value is set as the angle is nearer to a right angle. In the case of calculating a weight based on the shortest distance between the rays, a higher weight value is set as it is shorter. In the case of calculating a weight based on a weight value such as the position of the NF to be used or the amount indicating the feature degree thereof, a higher value is set as it is higher.

Figure 6A:
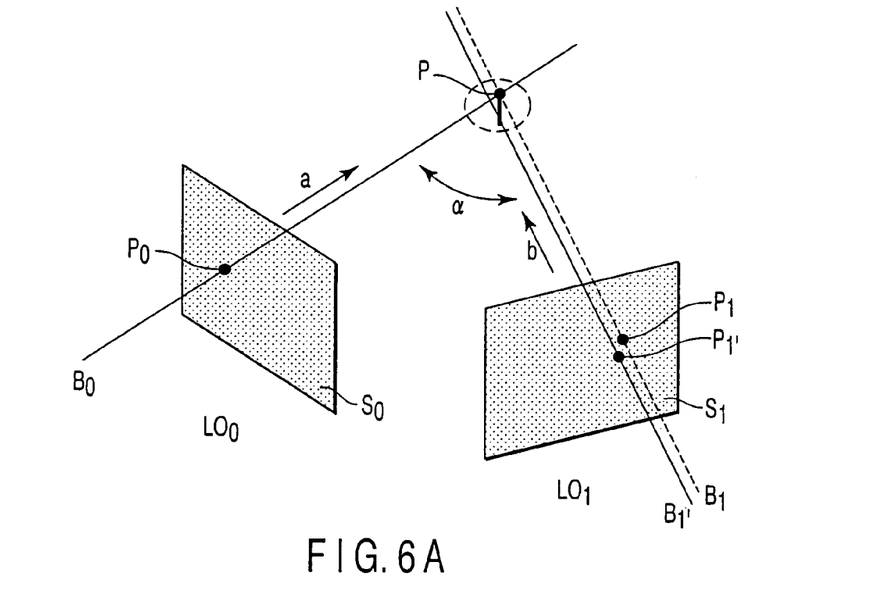
FIG. 6A is a diagram illustrating "an angle formed between rays" and "a shortest distance between rays".
Figure 6B:
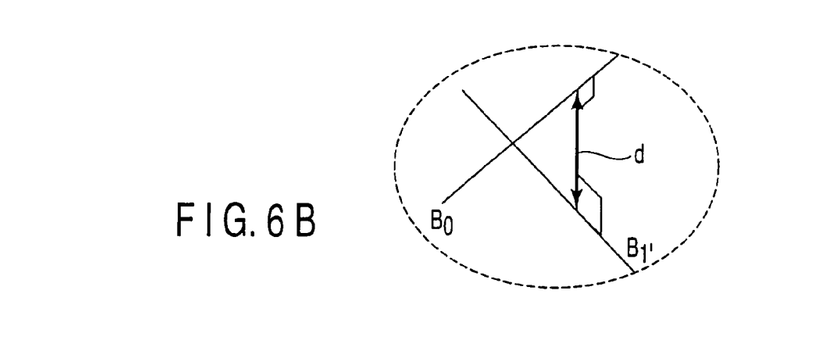
FIG. 6B is an enlarged diagram of a vicinity of a point P of a three-dimensional space in FIG. 6A.

Now, the "angle formed between rays" and the "shortest distance between rays" will be described by referring to FIGS. 6A and 6B. In these drawings, P0 is a point of projecting a point P of a three-dimensional space on an image S0 acquired in a position LO0. P1 is a point of projecting the point P of the three-dimensional space on an image S1 acquired in a position LO1. However, this point is recognized as P1' as it generally contains an error. A ray B0 for connecting the point P of the three-dimensional space to the point P0 on the image S0, and a ray B1 for connecting the point P of the three-dimensional space to the point P1 on the image S1 intersect each other. On the other hand, a ray B1' containing an error and the ray B0 do not intersect each other.

Assuming optional points such as the rays B0 and B1' on two straight lines, a distance d in which the points approach each other most can be calculated by a known equation. This distance will be referred to as a shortest distance between rays.

An angle $\alpha$ formed between the rays B0 and B1 is defined as follows in which a is a unit direction vector of the ray B0, and b is a unit direction vector of the ray B1:

$$\alpha = \cos^{-1}(a \cdot b/(|a||b|))$$

This angle $\alpha$ will be referred to as an angle formed between rays.

Thus, the NFAC weight calculation is repeated until an end of evaluation for all the NFAC's (step S26). After all the NFAC's have been evaluated, the process proceeds to the step S14 to calculate a position and an orientation of the image input section 11, i.e., the image processing device 10, from these weighted feature portions by the position orientation obtaining section 1213.

Natural feature segments are extracted as a feature portion from the input image 11A input from the image input section 11 and tracked by the feature extraction section 1211 (step S31). Details on the extraction and tracking of the natural feature segment are disclosed in the literature ISMAR 2001. Then, a weight of one of the natural feature segments is calculated by the weighting section 1212 (step S32).

In this case, the weight is calculated based on at least one of a position of the natural feature segment, a length of the natural feature segment, an amount of deviation of the natural feature segment from a straight line, and the number of tracking continuities in the input image 11A. In this weight calculation, an accurate value can be obtained by using a function equation. However, values of plural stages may be easily obtained from the table.

In the case of calculating a weight based on the position of the natural feature segment in the input image 11A, a higher weight value is set as the position is nearer to a center in the input image 11A. In the case of calculating a weight based on the length of the natural feature segment, a higher weight value is set as it is longer. In the case of calculating a weight based on the amount of deviation of the natural feature segment from the straight line, a higher weight value is set as the amount of deviation is smaller. In the case of calculating a weight based on the number of tracking continuities of the natural feature segment, a higher weight value is set as the number is larger.

Thus, the weight calculation of the natural feature segment is repeated until an end of evaluation for all the natural feature segments in the input image 11A (step S33). After all the natural feature segments have been evaluated, the feature extraction section 1211 executes auto-calibrations (LineACs) for the natural feature segments (step S34). Details on this LineAC are disclosed in the literature ISMAR 2001. Then, a weight of one of the LineACs is calculated by the weighting section 1212 (step S35).

In this case, the weight is calculated in accordance with a condition during AC of the natural feature segment. The condition during the AC of the natural feature segment is at least one of an angle formed between rays, an amount of deviation when equating is executed, a position of a natural feature segment to be used, a length of a natural feature segment to be used, and an amount of deviation of a natural feature segment to be used from a straight line. In this calculation, an accurate value can be obtained by using a function equation. However, values of plural stages may be easily obtained from the table.

In the case of calculating a weight based on the angle formed between the rays, a higher weight value is set as the angle is nearer to a right angle. In the case of calculating a weight based on the amount of deviation when equating is executed, a higher weight value is set as it is smaller. In the case of calculating a weight based on a weight value such as the position, the length, or the amount of deviation from the straight line of the natural feature segment to be used, a higher value is set as it is higher.

Thus, the LineAC weight calculation is repeated until an end of evaluation for all the LineAC's (step S36). After all the LineAC's have been evaluated, the process proceeds to the step S14 to calculate a position and an orientation of the image input section 11, i.e., the image processing device 10, from these weighted feature portions by the position orientation obtaining section 1213.

The calculation of the position and the orientation by the position and orientation obtaining section 1213 in the step S14 uses at least one of the marker, the NF, the NFAC point, the natural feature segment, and the natural feature segment subjected to AC. For example, when there is a mixture of the marker, the NFAC point, and the natural feature segment subjected to AC in the screen, each is weighted in accordance with the parameter, a position and an orientation of each are calculated, and then last position and orientation calculation (e.g., weighted averaging or calculation including prediction from past information (Kalman filter)) is carried out in accordance with the weight.

Figure 7:
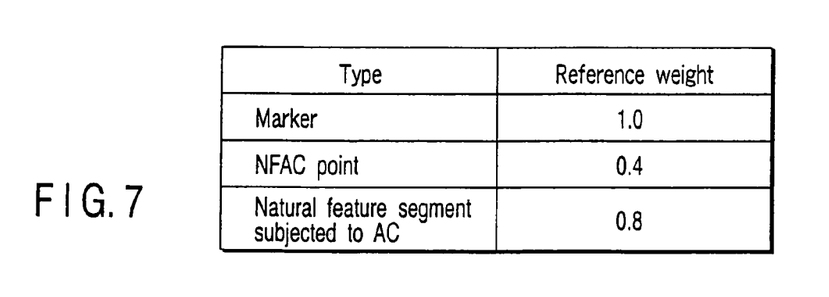
FIG. 7 is a diagram showing an example of a weight table by types of feature portions.

In this case, as shown in FIG. 7, weighting may be further carried out in accordance with a type of a feature portion. For example, as the marker is prepared beforehand, a reliable type is determined, and a weight "1.0", i.e., a weight added by the weighting section 1212, is directly used. On the other hand, in the case of the NFAC point, as the point is extracted from the image to calculate a three-dimensional position, various error causes are contained. Accordingly, "0.4" lower than that of the marker is set. In other words, a weight higher by 0.4 times than the weight value added by the weighting section 1212 is used as a weight. In the case of the natural feature segment subjected to AC, the segment is extracted from the image. However, reliability is higher as there is an element of continuity as a segment compared with the NFAC point. Hence, "0.8" higher than that of the NFAC point and lower than that of the marker is set.

As described above, the extracted feature portion is weighted to be used. As a result, a function of optically correcting the input image 11A and a function of calculating a parameter therefor are made unnecessary. Especially, when a plurality of markers are captured in the same visual field, calculation weights are varied in accordance with positions, sizes and distortion of the captured markers. Thus, calculation accuracy of the position and the orientation of the image input section 11 is improved.

A weight is changed in accordance with a feature degree height (height of tracking stability) and a position of the NF. Accordingly, the calculation accuracy of the position and the orientation of the image input section 11 is improved.

When the position and the orientation of the image input section 11 are calculated from the point subjected to NFAC, a weight is changed in accordance with an angle between rays during the NFAC, a shortest distance between optical axes, and attributes (feature degree height, position) of the NF used for the NFAC. Hence, the calculation accuracy of the position and the orientation of the image input section 11 is improved.

A weight is changed in accordance with the position, the length, and the amount of deviation of the natural feature segment. Accordingly, the calculation accuracy of the position and the orientation of the image input section 11 is improved.

When the position and the orientation of the image input section 11 are calculated from the segment subjected to LineAC, a weight is changed in accordance with the angle formed between rays, the amount of deviation when equating is executed, and the position, the length and the amount of deviation of the natural feature segment to be used from the straight line. Thus, the calculation accuracy of the position and the orientation of the image input section 11 is improved.

During the calculation of the position and the orientation, the position and orientation calculation by the marker, the position and orientation calculation by the NF, the position and orientation calculation by the NFAC, the position and orientation calculation by the natural feature segment, and the position and orientation calculation by the LineAC are processed in integrated fashion in consideration of weights. As a result, when the marker deviates from the screen in which the marker and the other feature portion, e.g., the NFAC, are mixed, or in a reverse case, the calculation accuracy of the position and the orientation of the image input section 11 is improved.

Application examples of the image processing device of the embodiment will be described below.

APPLICATION EXAMPLE 1

A device for realizing position and orientation calculation of the image acquisition apparatus according to the embodiment is configured as an image superimposition device (not including a function of removing distortion of an input image). As shown in FIG. 3, a plurality of markers 4 are stuck in a factory. In the case of the input image 11A of FIG. 3, a weight "0.8" is set for a marker having a pattern "A" based on its position, its size, and distortion in the input image 11A, a weight "0.6" is set for a marker having a pattern "L", and a weight "0.2" is set for a marker having a pattern "Z". By weighted averaging positions and orientations obtained from the markers, a last position and a last orientation of the image acquisition apparatus are obtained, and pipe information and three-dimensional models of pipes are superimposed on the input image to be displayed.

APPLICATION EXAMPLE 2

The image processing device of the embodiment is applied to a navigation system of a theme park. As the image processing device, a portable telephone equipped with a camera is assumed. In this case, a marker is installed in each attraction. Path information (superimposed to be displayed) for navigation between attractions is set based on a position and an orientation of the image acquisition apparatus obtained from at least one of an NFAC point and a natural feature segment subjected to AC. When a state is set in which the marker of the attraction is gradually captured in a visual field (input image), a weight is properly changed. Accordingly, based on most accurate position and orientation information of the image acquisition apparatus at the time, path information and a performance model (three-dimensional) of various attractions are obtained from a data set or the like prestored in a server or the portable telephone, and superimposed to be displayed.

APPLICATION EXAMPLE 3

The image processing device of the embodiment is applied to an image superimposition device. By giving input images corresponding to initial orientations of two states to an image superimposition display device, tracking by an NFAC point and a natural feature segment subjected to AC can be carried out. As a superimposition target, a three-dimensional model installed in a factory is stored. When many liner components are included in the three-dimensional model corresponding to a current visual field (input image), a weight to the natural feature segment is automatically increased. Hence, it is possible to realize image superimposition of higher accuracy.

The embodiment of the present invention has been described. However, the invention is not limited to the embodiment. Needless to say, various changes and modifications can be made within a gist and a scope of the invention. For example, according to the embodiment, the weights of the marker, the natural feature, the auto-calibrated natural feature, the natural feature segment, and the auto-calibrated natural feature segment are changed based on the information regarding the input image by the image acquisition apparatus or the like. However, an information source of the invention for changing weights is not limited to such. For example, when a three-dimensional model stored in a storage section (not shown) is specified based on a position and an orientation of the image acquisition apparatus, and the three-dimensional model includes many linear elements, as in the case of the Application Example 3, a weight of at least one of the natural feature segment and the auto-calibrated natural feature segment may be relatively increased. Similarly, when the three-dimensional model includes many corners, or has a texture recognized as a corner or a point, a weight of at least one of the natural feature point and the auto-calibrated natural feature may be relatively increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image processing device comprising:
    an image acquisition apparatus configured to acquire an image of an object;
    a feature extraction unit configured to extract a feature portion from a visual field of the image acquired by the image acquisition apparatus;
    a weighting section configured to calculate a weight in accordance with extraction conditions of the feature portion extracted by the feature extraction unit to weight the feature portion; and
    a position orientation obtaining section configured to obtain a position and an orientation of the image acquisition apparatus on a reference coordinate system from the feature portion weighted by the weighting section.

2. The image processing device according to claim 1, wherein
    the feature portion extracted by the feature extraction section is a marker which is included in the visual field of the image acquired by the image acquisition apparatus and whose position and orientation are known, and
    the weighting section decides the weight based on at least one of a position of the marker, a size of the marker, a distortion amount of the marker, and an orientation of the marker with respect to the image acquisition apparatus.

3. The image processing device according to claim 2, wherein the weighting section sets a higher weight value as a position of the marker is nearer to a center in the visual field of the image acquired by the image acquisition apparatus.

4. The image processing device according to claim 2, wherein the weighting section sets a higher weight value as the marker is larger in the visual field of the image acquired by the image acquisition apparatus.

5. The image processing device according to claim 2, wherein the weighting section sets a higher weight value as a distortion amount of the marker is smaller.

6. The image processing device according to claim 2, wherein the weighting section sets a lower weight value as an orientation of the marker with respect to the image acquisition apparatus is nearer to a front, and a higher weight value as it is nearer to a right angle.

7. The image processing device according to claim 1, wherein
    the feature portion extracted by the feature extraction section is a natural feature included in the visual field of the image acquired by the image acquisition apparatus, and
    the weighting section decides a weight based on at least one of a position of the natural feature, an amount indicating a feature degree of the natural feature, and a number of tracking continuities of the natural feature.

8. The image processing device according to claim 7, wherein the weighting section sets a higher weight value as the position of the natural feature is nearer to a center of the visual field of the image acquired by the image acquisition apparatus.

9. The image processing device according to claim 7, wherein the amount indicating the feature degree of the natural feature is at least one of a minimum unique value of a variance covariance matrix around the natural feature and intensity of a pixel value.

10. The image processing device according to claim 7, wherein the weighting section sets a higher weight value as the number of tracking continuities of the natural feature is larger.

11. The image processing device according to claim 1, wherein
    the feature extraction section extracts a natural feature included in the visual field of the image acquired by the image acquisition apparatus, and executes auto-calibration for the natural feature to extract an auto-calibrated point as the feature portion, and
    the weighting section decides a weight based on a condition during the auto-calibration of the natural feature by the feature extraction section.

12. The image processing device according to claim 11, wherein the condition during the auto-calibration of the natural feature is at least one of an angle formed between rays, a shortest distance between rays, a position of a natural feature to be used, an amount indicating a feature degree of the natural feature to be used, and a number of tracking continuities of a feature to be used.

13. The image processing device according to claim 12, wherein the weighting section sets a higher weight value as the angle formed between the rays is nearer to a right angle.

14. The image processing device according to claim 12, wherein the weighting section sets a higher weight value as the shortest distance between the rays is shorter.

15. The image processing device according to claim 12, wherein the weighting section sets a higher weight value as a weight value of the natural feature to be used is higher.

16. The image processing device according to claim 1, wherein
the feature portion extracted by the feature extraction section is a natural feature segment included in the visual field of the image acquired by the image acquisition apparatus, and
the weighting section decides a weight based on at least one of a position of the natural feature segment, a length of the natural feature segment, an amount of deviation of the natural feature segment from a straight line, and a number of tracking continuities of the natural feature segment.

17. The image processing device according to claim 16, wherein the weighting section sets a higher weight value as the position of the natural feature segment is nearer to the center of the visual field of the image acquired by the image acquisition apparatus.

18. The image processing device according to claim 16, wherein the weighting section sets a higher weight value as the length of the natural feature segment is longer.

19. The image processing device according to claim 16, wherein the weighting section sets a higher weight value as the amount of deviation of the natural feature segment from the straight line is smaller.

20. The image processing device according to claim 16, wherein the weight section sets a higher weight value as the number of tracking continuities of the natural feature segment is larger.

21. The image processing device according to claim 1, wherein
the feature extraction section extracts a natural feature segment included in the visual field of the image acquired by the image acquisition apparatus, and executes auto-calibration for the natural feature segment to extract an auto-calibrated segment as the feature portion, and
the weighting section decides a weight based on a condition during the auto-calibration of the natural feature segment by the feature extraction section.

22. The image processing device according to claim 21, wherein the condition during the auto-calibration of the natural feature segment is at least one of an angle formed between rays, an amount of deviation in the case of equating, a position of the natural feature segment to be used, an amount of deviation of the natural feature segment to be used from a straight line, and a number of tracking continuities of the natural feature segment to be used.

23. The image processing device according to claim 22, wherein the weighting section sets a higher weight value as the angle formed between the rays is nearer to a straight line.

24. The image processing device according to claim 22, wherein the weighting section sets a higher weight value as the amount of deviation in the case of equating is smaller.

25. The image processing device according to claim 22, wherein the weighting section sets a higher weight value as a weight value of the natural feature segment to be used is higher.

26. The image processing device according to claim 1, wherein
when the feature extraction section extracts a plurality of feature portions from the visual field of the image acquired by the image acquisition apparatus,
the weighting section calculates weights individually for the plurality of feature portions to execute weighting, and
the position orientation obtaining section calculates the position and the orientation of the image acquisition apparatus from the weighted feature portions.

27. The image processing device according to claim 26, wherein in the calculation by the position orientation obtaining section, a last position and a last orientation of the image acquisition apparatus is calculated by one of weighted averaging of positions and orientations obtained for the plurality of weighted feature portions and calculation including prediction from past information.

28. The image processing device according to claim 26, wherein
each feature portion is one of a marker whose position and orientations are known, a natural feature, an auto-calibrated point of the natural feature, a natural feature segment, and an auto-calibrated segment of the natural feature segment, and
the weighting section decides a weight based on at leas one of a position of the marker, a size of the marker, a distortion amount of the marker, a position of the marker with respect to the image acquisition apparatus, a position of the natural feature, an amount indicating a feature degree of the natural feature, a number of tracking continuities of the natural feature, a condition during auto-calibration of the natural feature, a position of the natural feature segment, a length of the natural feature segment, a deviation amount of the natural feature segment from a straight line, a number of tracking continuities of the natural feature segment, and a condition during auto-calibration of the natural feature segment.

29. The image processing device according to claim 28, wherein in the calculation by the position orientation obtaining section, a last position and a last orientation of the image acquisition apparatus is calculated by one of weighted averaging of positions and orientations obtained for the plurality of weighted feature portions and calculation including prediction from past information.

30. The image processing device according to claim 26, wherein
each feature is one of a marker whose position and orientation are known, a natural feature, an auto-calibrated point of the natural feature, a natural feature segment, and an auto-calibrated segment of the natural feature segment, and
the position orientation obtaining section executes further weighting in accordance with a type of a feature to calculate a position and an orientation.

31. The image processing device according to claim 30, wherein in the calculation by the position orientation obtaining section, a last position and a last orientation of the image acquisition apparatus is calculated by one of weighted averaging of positions and orientations obtained for the plurality of weighted feature portions and calculation including prediction from past information.

32. The image processing device according to claim 30, wherein the weighting section decides a weight based on at least one of a position of the marker, a size of the marker, a distortion amount of the marker, a condition during the auto-calibration of the natural feature, and a condition during the auto-calibration of the natural feature segment, and the position orientation obtaining section further adds a weight highest when decided based on one of the position of the marker, the size of the marker, and the distortion amount of the marker, a weight next higher when decided based on the condition during the auto-calibration of the natural feature segment, and a weight lowest when decided based on the condition during the auto-calibration of the natural feature to the feature portion weighted by the weighting section.

33. The image processing device according to claim 32, wherein in the calculation by the position orientation obtaining section, a last position and a last orientation of the image acquisition apparatus is calculated by one of weighted averaging of positions and orientations obtained for the plurality of weighted feature portions and calculation including prediction from past information.

34. An image processing device comprising:

image acquisition means for acquiring an image of an object;

feature extraction means for extracting a feature portion from a visual field of the image acquired by the image acquisition means;

weighting means for calculating a weight in accordance with extraction conditions of the feature portion extracted by the feature extraction means to weight the feature portion; and position orientation obtaining means for obtaining a position and an orientation of the image acquisition means on a reference coordinate system from the feature portion weighted by the weighting means.

* * * * *